(12) United States Patent
Ramamurthy et al.

(10) Patent No.: US 9,008,976 B2
(45) Date of Patent: Apr. 14, 2015

(54) WIRELESS TORQUE MEASUREMENT SYSTEM USING PROGRAMMABLE GAIN AMPLIFIER

(75) Inventors: Gautham Ramamurthy, Bangalore (IN); Vishal Malhan, Bangalore (IN); Ramesh Venkanna, Bangalore (IN); Brian Richards, Upper Arlington, OH (US); Terry L. Huber, Lewisburg, OH (US)

(73) Assignee: Honeywell International Inc., Morristown, NJ (US)

( * ) Notice: Subject to any disclaimer, the term of this patent is extended or adjusted under 35 U.S.C. 154(b) by 633 days.

(21) Appl. No.: 13/369,660

(22) Filed: Feb. 9, 2012

(65) Prior Publication Data

US 2013/0211740 A1    Aug. 15, 2013

(51) Int. Cl.
G01L 1/00    (2006.01)
G01L 3/10    (2006.01)
G01L 3/14    (2006.01)

(52) U.S. Cl.
CPC ............... G01L 3/108 (2013.01); G01L 3/1457 (2013.01)

(58) Field of Classification Search
None
See application file for complete search history.

(56) References Cited

U.S. PATENT DOCUMENTS

2008/0036617 A1* 2/2008 Arms et al. ............... 340/679
2011/0285527 A1* 11/2011 Arms et al. ............. 340/539.1

OTHER PUBLICATIONS

"Torque Sensor", http://en.wikipedia.org/wiki/Torque_sensor, downloaded on Sep. 11, 2011, 1 page.
David Schrand, "The Basics of Torque Measurement", Technical Notes and Articles, www.sendev.com, Access date Sep. 11, 2011, 3 pages.
"New TMS 9250 Digital Telemetry Rotary Torque Measurement System", https://measurementsensors.honeywell.com/news/newproducts/, downloaded on Sep. 12, 2011, 1 page.
"TMS 9250 Product User Manual", Jun. 2011, 57 pages.

* cited by examiner

*Primary Examiner* — Aditya Bhat
(74) *Attorney, Agent, or Firm* — Craige Thompson; Thompson Patent Law

(57) ABSTRACT

A system includes a rotor, a rotor antenna attached to the rotor, a strain detection device attached to the rotor, a programmable gain amplifier attached to the rotor, and a control module attached to the rotor. The strain detection device is configured to generate signals that indicate an amount of strain in the rotor. The programmable gain amplifier is configured to amplify the signals generated by the strain detection device by a gain value. The gain value is programmable. The control module is configured to program the gain value of the programmable gain amplifier and transmit, via the rotor antenna, digital data that is derived from the amplified signals.

19 Claims, 7 Drawing Sheets

WIRELESS TORQUE MEASUREMENT SYSTEM USING PROGRAMMABLE GAIN AMPLIFIER

TECHNICAL FIELD

The disclosure relates to torque measurement systems, and, more particularly, to torque measurement systems including wireless telemetry systems.

BACKGROUND

A torque sensing system may measure and record torque applied to a component of a rotating system. Example rotating systems may include combustion engines, electric motors, drive shafts, and many other systems that have one or more rotating elements. A variety of different types of torque sensing systems may be used for measuring torque in rotating systems. In general, a torque sensing system may include sensors attached to the rotating portion of the system and may include stationary electronics that are located off of the rotating portion. In some examples, a slip ring and brush system may make a communication connection between rotating sensors and stationary electronics.

SUMMARY

A torque measurement system of the present disclosure may determine an amount of torque being applied to component of a rotating system in real-time. The torque measurement system may include a rotor that may be integrated into the rotating system. The rotor may include a rotor antenna, a strain detection device, and rotor electronics that are attached to the rotor and that rotate along with the rotor. Additionally, the torque measurement system may include a stator antenna and a signal processing module that are detached from the rotor and remain stationary while the rotor rotates. The rotor antenna may receive power and data from an RF signal received via the stator antenna.

The rotor electronics of the present disclosure may include a programmable gain amplifier. The programmable gain amplifier may receive strain signals (e.g., a voltage) generated by the strain detection device that indicate an amount of strain in the rotor. The programmable gain amplifier may amplify the received signals by a programmable gain value. The torque measurement system (e.g., the rotor electronics and/or the signal processing module) may determine the amount of torque being applied to the rotor based on the amplified signals. The programmable gain amplifier included in the rotor electronics may provide for accuracy and flexibility in measuring strains in a variety of different systems that generate a variety of different torques. For example, the programmable gain may allow for accurate amplification and digitization of a wide range of strain signals (e.g., low value strain signals as well as larger value strain signals). Additionally, the programmable gain value may be modified in order to prevent saturation of the output voltage of the programmable gain amplifier.

In some examples according to the present disclosure, a system comprises a rotor, a rotor antenna attached to the rotor, a strain detection device attached to the rotor, a programmable gain amplifier attached to the rotor, and a control module attached to the rotor. The strain detection device is configured to generate signals that indicate an amount of strain in the rotor. The programmable gain amplifier is configured to amplify the signals generated by the strain detection device by a gain value. The gain value is programmable. The control module is configured to program the gain value of the programmable gain amplifier and transmit, via the rotor antenna, digital data that is derived from the amplified signals.

In some examples according to the present disclosure, a system comprises a rotor antenna configured to attach to a rotor, a strain detection device configured to attach to the rotor, a programmable gain amplifier configured to attach to the rotor, a control module configured to attach to the rotor, a stator antenna, and a signal processing module. The strain detection device is configured to generate signals that indicate an amount of strain in the rotor. The programmable gain amplifier is configured to amplify the signals generated by the strain detection device by a gain value. The gain value is programmable. The control module is configured to program the gain value of the programmable gain amplifier and transmit, via the rotor antenna, digital data that is derived from the amplified signals. The stator antenna is configured to communicate with the rotor antenna while the rotor is rotating. The signal processing module is configured to receive, via the stator antenna, the digital data transmitted by the control module.

In some examples according to the present disclosure, a system comprises a mechanical component configured to receive a force, a first antenna attached to the mechanical component, a strain detection device attached to the mechanical component, a programmable gain amplifier attached to the mechanical component, a control module attached to the mechanical component, a second antenna, and a signal processing module. The strain detection device is configured to generate signals that indicate an amount of strain in the mechanical component. The programmable gain amplifier is configured to amplify the signals generated by the strain detection device by a gain value. The gain value is programmable. The control module is configured to program the gain value of the programmable gain amplifier and transmit, via the first antenna, digital data that is derived from the amplified signals. The second antenna is detached from the mechanical component and is configured to communicate with the first antenna. The signal processing module is configured to transmit, via the second antenna, signals that provide power and data to the control module. The signal processing module is further configured to receive, via the second antenna, the digital data transmitted by the control module.

The details of one or more examples are set forth in the accompanying drawings and the description below. Other features, objects, and advantages will be apparent from the description and drawings, and from the claims.

DETAILED DESCRIPTION

Figure 1:
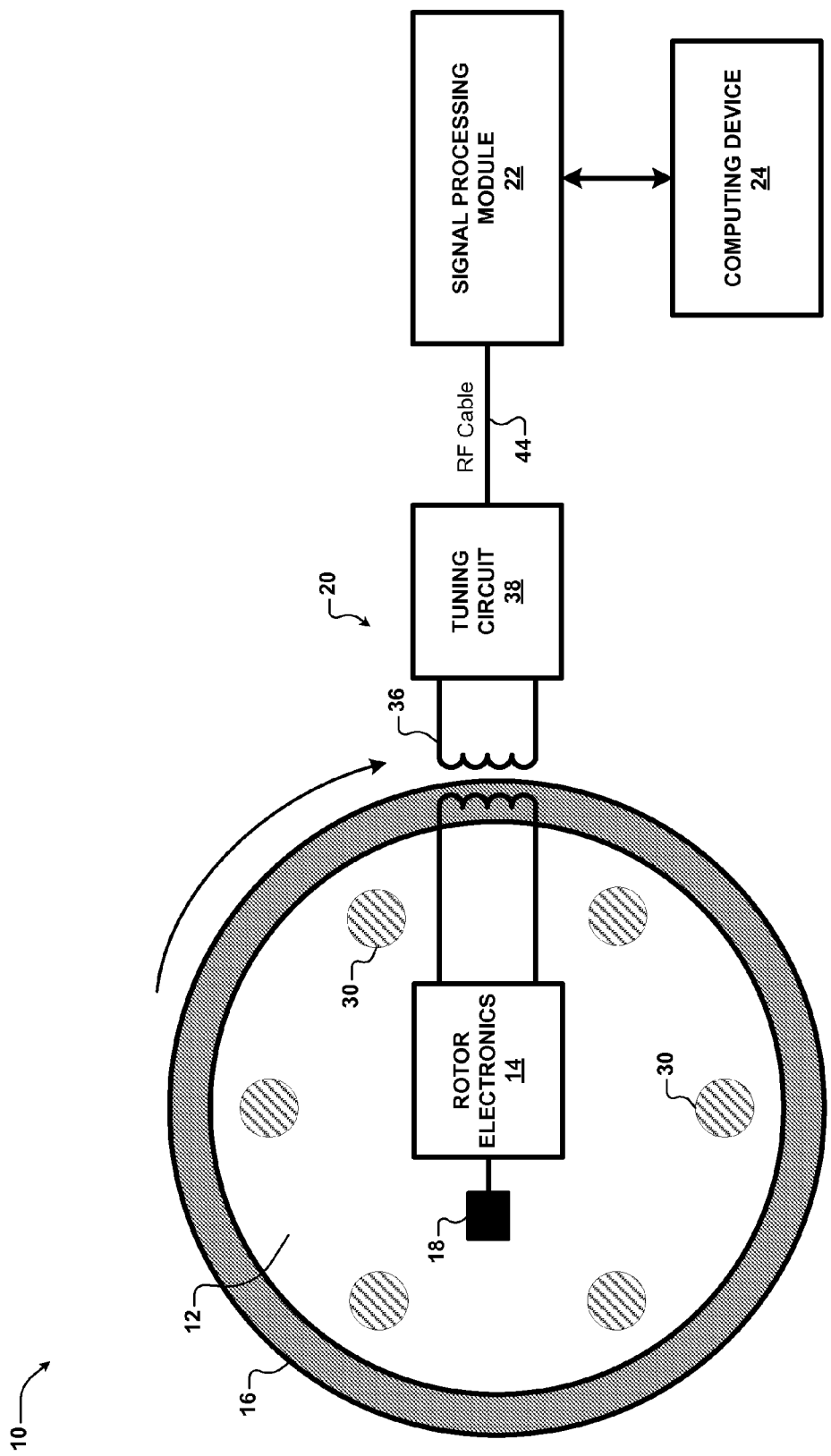
FIGS. 1-2 are block diagrams that show an example torque measurement system that determines an amount of torque being experienced by a rotor.

A torque measurement system of the present disclosure may determine an amount of torque being applied to a static or moving object in real-time. For example, the torque measurement system of the present disclosure may determine an amount of torque being applied to a rotor as the rotor is rotating. The torque measurement system may include a strain detection device (e.g., one or more strain gauges) mounted (i.e., attached) to the rotor and configured to measure an amount of strain in the rotor. The rotor of the torque measurement system may also include rotor electronics and a rotor antenna. The rotor electronics may transmit data derived from the strain measurements off of the rotating rotor via the rotor antenna. The torque measurement system may include a stator antenna arranged adjacent to the rotor that receives the data transmitted from rotor antenna.

A signal processing module may acquire the data received by the stator antenna, determine an amount of torque being applied to the rotor, and display the torque data to a user and/or store the data for subsequent analysis. The signal processing module may include an RF generator circuit that generates an RF signal (e.g., a carrier wave) that is transmitted from the stator antenna to the rotor antenna. The rotor electronics may receive the RF signal via the rotor antenna and generate a supply voltage that powers the rotor electronics and the strain detection device so that strain measurements may be taken and so that the rotor electronics may derive data from the strain measurements and transmit the derived data back to the stator antenna.

The rotor electronics described in the present disclosure may include a programmable gain amplifier that receives strain signals (e.g., voltages) from the strain detection device and amplifies the strain signals using a gain value that is programmable. The rotor electronics may include a control module (e.g., a microcontroller) that programs the gain value of the programmable gain amplifier. An analog-to-digital converter (ADC), configured to digitize the amplified strain signals, may be arranged between the programmable gain amplifier and the control module. The programmable gain amplifier of the torque measurement system may provide for accuracy and flexibility when measuring a range of torques applied to the rotor. The flexibility and accuracy, which may be provided by the programmable gain amplifier, are described hereinafter with respect to an example testing system.

The torque measurement system consistent with one or more examples of the present disclosure may be integrated into a testing system. In general, a testing system may refer to any mechanical device that has been instrumented with the torque measurement system of the present disclosure in order to determine torque values associated with the mechanical device. In some examples, the torque measurement system may be integrated into an automotive powertrain testing system to measure torque values associated with an engine, transmission, driveshaft, wheels, etc. In other examples, the torque measurement system may be integrated into a gear box testing system, a pump testing system, or an electric motor testing system to measure torque values associated with output shafts of those systems.

A testing system consistent with that described herein may include a driving shaft and an output shaft which are coupled with the rotor of the torque sensing system. The driving shaft of the testing system may be driven by a power source such as an engine or an electric motor. The driving shaft, which is connected to the rotor, may apply a torque to the rotor. The rotor, which is connected to the output shaft, may apply the torque to the output shaft in order to rotate the output shaft and drive a load attached to the output shaft. The torque experienced by the rotor may cause a strain in the rotor, which may be measured by the strain detection device and the rotor electronics of the torque measurement system. The torque measurement system may determine an amount of torque being applied to the rotor based on the strain in the rotor, as measured by the rotor electronics.

Components of different testing systems may be subjected to a variety of different ranges of torques, depending on the types of power sources and loads being used in the testing systems. For example, power sources may generate an amount of power that ranges from tens of watts up to multiple megawatts. Accordingly, the driving shaft of the testing system may cause a variety of different torques to be experienced by the rotor, depending on the type of testing system in which the torque measurement system is included. In other words, the amount of strain experienced by the rotor may vary depending on the application. The programmable gain amplifier included in the rotor electronics may provide for accuracy and flexibility in measuring strains in a variety of different testing systems that generate a variety of different torques.

The amplitude of the strain signals (e.g., voltages) generated by the strain detection device may depend on the amount of strain experienced by the rotor. In some examples, a greater amount of strain in the rotor may cause the strain detection device to generate signals having a greater amplitude. In these examples, a smaller amount of strain in the rotor may cause the strain detection device to generate signals having a smaller amplitude. For a given gain value of the programmable gain amplifier, the amplitude of the amplified signals may vary along with the amplitude of the strain signals. In some examples, the magnitude of the strain measured by the strain detection device may be large enough to cause the programmable gain amplifier to saturate. Saturation of the programmable gain amplifier may refer to a scenario in which the amplified voltage output by the programmable gain amplifier is limited to a voltage value near the power supply voltage of the rotor electronics. In this scenario, it could be said that the programmable gain amplifier has amplified the signal too much, and that the gain value of the programmable gain amplifier was set to value that is too large. The gain value of the programmable gain amplifier included in the torque sensing system of the present disclosure may be reduced in order to prevent, or remedy, saturation of the programmable gain amplifier.

In other scenarios, the gain value of the programmable gain amplifier may be set too low. In these scenarios, the resolution of the digitized data (e.g., the amount of strain per bit) derived from the amplified signals is lower than could be achieved using a larger gain value. In other words, the programmable gain amplifier may not be amplifying the strain signals by a large enough value to take advantage of the full scale of the ADC in these scenarios. In terms of accuracy of the digitized strain signals, it may be beneficial for the ADC of the rotor electronics to receive an amplified voltage that ranges from a minimum value that may be digitized by the ADC to a value that is nearly full scale, i.e., has a magnitude that is at the maximum value that may be digitized by the ADC. The gain value of the programmable gain amplifier may be adjusted so that the programmable gain amplifier tends to maximize the amplitude of the amplified voltage which is subsequently digitized, thereby maximizing the number of bits available to represent a measured strain signal.

The gain value programmed into the programmable gain amplifier may be selected in a variety of different ways. In some examples, a user may supply an expected torque value to the signal processing module using a computing device. The expected torque value may indicate an amount of torque the user expects the rotor to experience when force is applied to the rotor under a current testing setup. In these examples, the torque measurement system (e.g., control module or processing module) may determine a gain value based on the expected torque value. In other examples, a user may instruct the torque measurement system to automatically adjust the gain value of the programmable gain amplifier. In these examples, the torque measurement system may automatically adjust the gain value of the programmable gain amplifier in order to prevent saturation of the output voltage of programmable gain amplifier. In still other examples, automatic gain adjustments, consistent with the techniques of this disclosure, may be fully automated without any user input or instruction.

Figure 2:
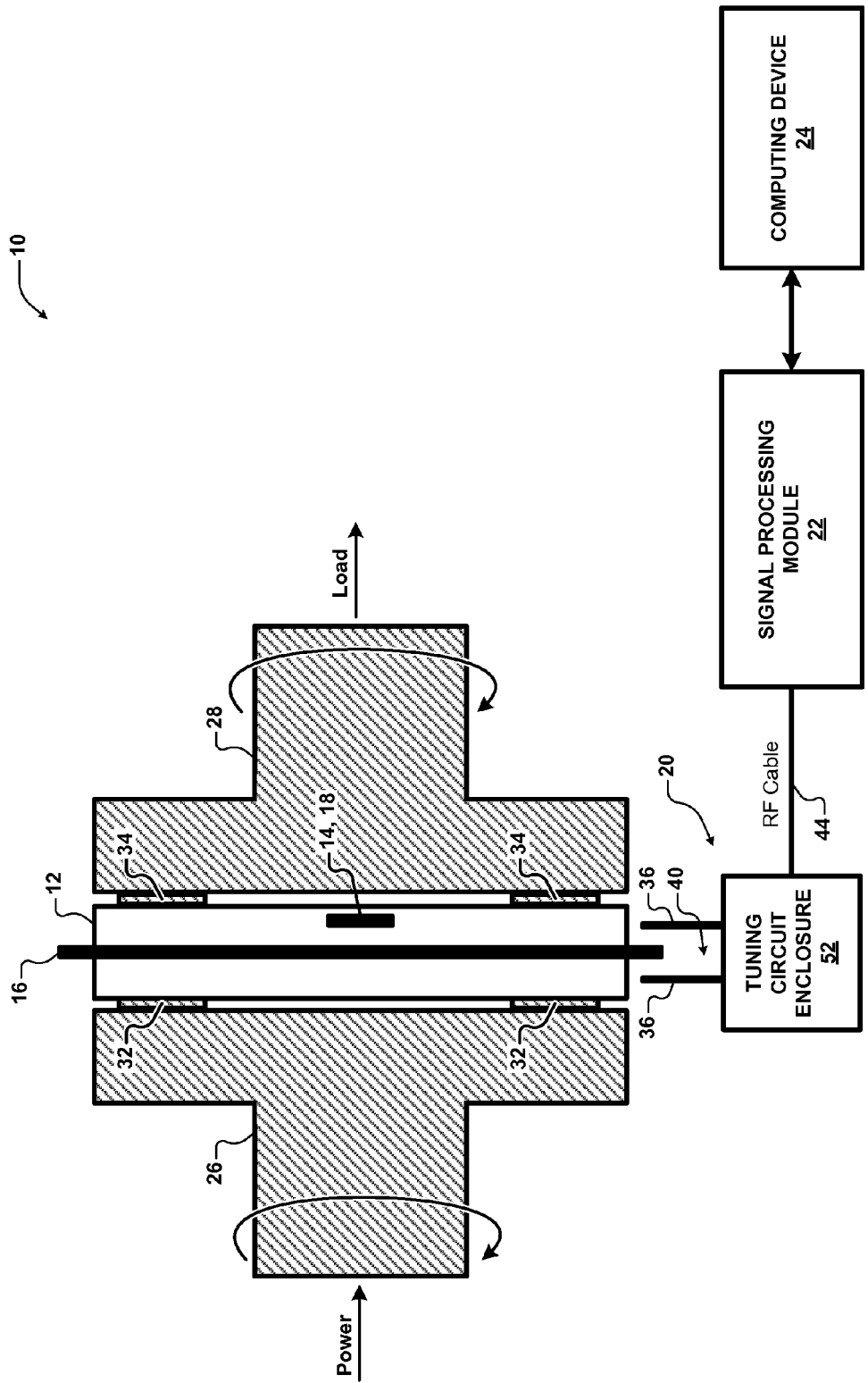

FIGS. 1-2 are block diagrams that show an example torque measurement system 10 that determines an amount of torque being experienced by a rotor 12. Torque measurement system 10 includes rotating components and stationary components. Rotating components may include rotor 12, rotor electronics 14, a rotor antenna 16, and a strain detection device 18. Stationary components may include a stator module 20, a signal processing module 22, and a computing device 24.

Modules of the present disclosure, e.g., stator module 20, signal processing module 22, and modules included in rotor electronics 14, may represent functionality that may be included in torque measurement system 10 of the present disclosure. Modules of the present disclosure may include any discrete and/or integrated electronic circuit components that implement analog and/or digital circuits capable of producing the functions attributed to the modules herein. For example, the modules may include analog circuits, e.g., amplification circuits, filtering circuits, and/or other signal conditioning circuits. The modules may also include digital circuits, e.g., combinational or sequential logic circuits, memory devices, etc. Memory may include any volatile, non-volatile, magnetic, or electrical media, such as a random access memory (RAM), read-only memory (ROM), non-volatile RAM (NVRAM), electrically-erasable programmable ROM (EEPROM), Flash memory, or any other memory device. Furthermore, memory may include instructions that, when executed by one or more processing circuits, cause the modules to perform various functions attributed to the modules herein.

The functions attributed to the modules herein may be embodied as one or more processors, hardware, firmware, software, or any combination thereof. Depiction of different features as modules is intended to highlight different functional aspects and does not necessarily imply that such modules must be realized by separate hardware or software components. Rather, functionality associated with one or more modules may be performed by separate hardware or software components, or integrated within common or separate hardware or software components.

Torque measurement system 10 may be included in a variety of different testing systems in order to measure torque values associated with those testing systems. In some examples, torque measurement system 10 may be used in an automotive powertrain testing system that is configured to test torque values associated with an engine, transmission, driveshaft, wheels, etc. In other examples, torque measurement system 10 may be used in a pump testing system or an electric motor testing system that is configured to measure torque values associated with those systems. Although torque measurement system 10 may be included in the above described systems, it is contemplated that torque measurement system 10 may be used to determine torque in any general mechanical system.

Components of an example testing system may be illustrated herein by a driving shaft 26 and an output shaft 28. Driving shaft 26, attached to rotor 12, may be driven by a power source, such as a combustion engine or an electric motor. Driving shaft 26 may be coupled to output shaft 28 via rotor 12 such that driving shaft 26 applies a torque to rotor 12, which in turn applies a torque to output shaft 28. Output shaft 28 may represent a component of a testing system that may attach to a load.

Rotor 12 may comprise a metal disk (e.g., a flange) including holes (e.g., 30) for attachment to driving shaft 26 and output shaft 28. Rotor 12 may be attached to driving shaft 26 on one side and output shaft 28 on the other side. For example, with respect to FIG. 2, rotor 12 may include a first face that is attached to driving shaft 26 using fasteners 32. In some examples, fasteners 32 may comprise bolts that are fit through matching holes defined in both driving shaft 26 and rotor 12. A second face of rotor 12 may be attached to output shaft 28 using fasteners 34. In some examples, fasteners 34 may comprise bolts that are fit through matching holes defined in both output shaft 28 and rotor 12.

Rotor antenna 16 (e.g., an inductor or other antenna) may be attached to rotor 12 and may rotate along with rotor 12. As illustrated in FIGS. 1-2, rotor antenna 16 may be in the form of a ring that is fixed to rotor 12 around the circumference of rotor 12. In some examples, rotor antenna 16 may comprise an antenna (e.g., illustrated as an inductor in FIG. 1) that is embedded in a printed circuit board (PCB) that is configured to fit around the circumference of rotor 12. Although rotor antenna 16 is illustrated as a ring that is fixed around the circumference of rotor 12, it is contemplated that a rotor antenna having different form factors may be used in torque measurement system 10.

Stator module 20, which includes a stator antenna 36 and a passive tuning network 38 (e.g., a circuit), may be stationary relative to rotor antenna 16. In other words, rotor antenna 16 may rotate while stator antenna 36 may be stationary. Stator antenna 36 and rotor antenna 16 may be arranged such that a portion of rotor antenna 16 is in proximity to stationary stator antenna 36 while rotor antenna 16 is rotating. In FIG. 2, stator antenna 36 is illustrated as having two portions that define a center region 40 through which rotor antenna 16 may move as rotor 12 is rotating.

Signal processing module 22 may generate an RF signal that is transmitted from stator antenna 36 to rotor antenna 16. Rotor electronics 14 may be powered by the RF signal received via rotor antenna 16. For example, rotor electronics 14 may be powered by the RF signal while rotor 12 is rotating, and while rotor 12 is stationary. Rotor electronics 14 and signal processing module 22 may communicate with one another via antennas 16, 36 while rotor 12 is rotating, and while rotor 12 is stationary. Power transfer from signal processing module 22 to rotor electronics 14 and communication between signal processing module 22 and rotor electronics 14 are described hereinafter.

Rotor electronics 14 and strain detection device 18 may be mounted (i.e., attached) to rotor 12. Rotor electronics 14 may provide power to strain detection device 18. Strain detection device 18 may generate signals (e.g., voltage signals) that indicate an amount of strain in rotor 12. The signals generated by strain detection device 18 that indicate the amount of strain in rotor 12 may be referred to herein as "strain signals." Rotor electronics 14 may receive the strain signals generated by strain detection device 18. Rotor electronics 14 may amplify the strain signals received from strain detection device 18. The strain signals amplified by rotor electronics 14 may be referred to herein as "amplified strain signals." Rotor electronics 14 may digitize the amplified strain signals, e.g., using an analog-to-digital converter. The digitized signals may be referred to herein as "raw strain data" or as "strain data." Rotor electronics 14 may transmit the strain data to stator module 20 via a rotor antenna 16 using a detuning operation. For example, rotor electronics 14 may transmit data using an amplitude shift keying scheme.

Signal processing module 22 may include an RF generator module 42 that generates the RF signal (e.g., a carrier signal at 6.78 MHz or 13.56 MHz) that provides energy to rotor electronics 14. The RF signal may be transferred from signal processing module 22 to stator module 20 via RF cable 44. RF cable 44 may be a triaxial cable in some examples. Passive tuning network 38 may include a network of passive components, such as resistors, capacitors, and/or inductors, for example. The components of passive tuning network 38 (e.g., capacitors) may be used to tune antenna 36 to a carrier frequency.

Signal processing module 22 and rotor electronics 14 may communicate with one another. For example, signal processing module 22 may transmit data to rotor electronics 14 by varying the amplitude of the RF signal. In some examples, the data transmitted to rotor electronics 14 may include gain values to be programmed into a programmable gain amplifier 46 of rotor electronics 14, or other values which may be used by rotor electronics 14 to determine a gain value to be programmed into programmable gain amplifier 46. Rotor electronics 14 may transmit strain data, or other data, to signal processing module 22 by detuning a circuit in rotor electronics 14. Rotor antenna 16 and stator antenna 36 may be configured (e.g., arranged) such that rotor antenna 16 and stator antenna 36 remain in communication with one another while rotor 12 is rotating, and while rotor 12 is stationary. In some examples, rotor antenna 16 and stator antenna 36 may be referred to as "inductively coupled."

Computing device 24 may comprise a general purpose computing device, such as a desktop computer, laptop computer, tablet computer, handheld computer, or smartphone. Alternatively, computing device 24 may be a specific-purpose computer implemented specially for interacting with torque measurement system 10. In any case, a user may interact with torque measurement system 10 using computing device 24. In one example, a user may program torque measurement system 10 using computing device 24. For example, the user may enter expected torque values into computing device 24, which torque measurement system 10 may use to determine gain values for programmable gain amplifier 46, as described hereinafter. In some examples, the user may view and store data generated by torque measurement system 10 using computing device 24. Example data that may be viewed and stored using computing device 24 may include strain data, torque data, or other data derived from the strain data, for example.

Torque measurement system 10 may determine an amount of torque being applied to rotor 12 (e.g., an amount of torque applied to driving shaft 26) based on the strain data (e.g., digitized strain signals) generated by rotor electronics 14. In some examples, rotor electronics 14 may determine an amount of torque being applied to rotor 14 based on the strain data. In other examples, rotor electronics 14 may transmit the strain data to signal processing module 22, which may then determine the amount of torque being experienced by rotor 14 based on the strain data. In still other examples, computing device 24 may determine the amount of torque being applied to rotor 14 based on the strain data.

Figure 3:
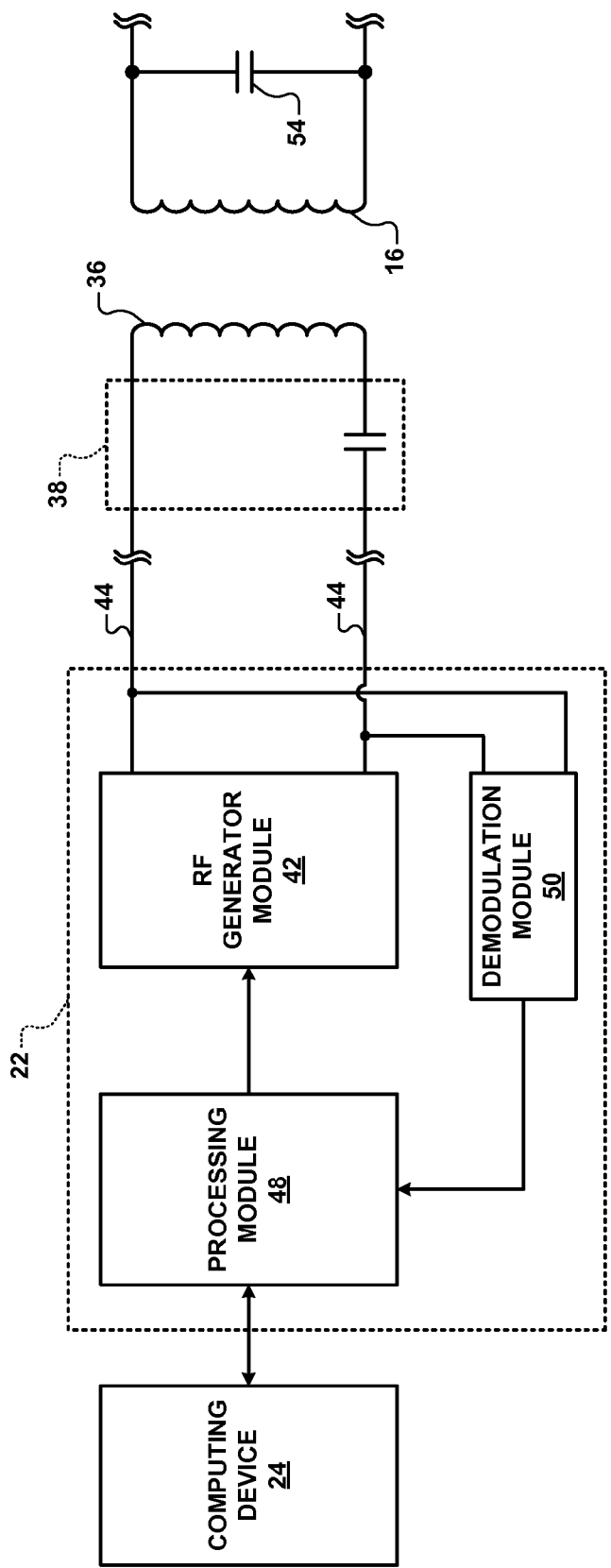
FIG. 3 is a functional block diagram that shows an example signal processing module of the torque measurement system of FIGS. 1-2.

Operation of signal processing module 22, stator module 20, and rotor electronics 14 are now described with reference to FIGS. 3-4. FIG. 3 is a functional block diagram that shows a more detailed view of signal processing module 22. Signal processing module 22 includes a processing module 48, RF generator module 42, and a demodulation module 50. In some examples, the components of signal processing module 22 may be housed in an enclosure. For example, the enclosure may be a metal enclosure that houses a PCB, to which processing module 48, RF generator module 42, and demodulation module 50 are attached. The enclosure may define openings through which cables may be fed. For example, the enclosure may define openings through which RF cable 44 may be fed, through which a data cable from computing device 24 may be fed (e.g., an RS-232 cable), and through which a power cable may be fed from a power supply (not shown) that provides power to signal processing module 22.

RF generator module 42 may be connected to passive tuning network 38 using RF cable 44. RF cable 44 may include multiple conductors, which are each labeled as 44 in FIG. 3. In the example of FIG. 3, passive tuning network 38 includes a capacitor connected in series with stator antenna 36. In some examples, passive tuning network 38 may be included in an enclosure 52 to which stator antenna 36 may be mounted.

RF generator module 42 may generate an RF signal that is transmitted by stator antenna 36 to rotor antenna 16. The RF signal transmitted by RF generator module 42 may provide power to rotor electronics 14 and strain detection device 18. In some examples, RF generator module 42 may generate RF signals at 6.8 MHz or 13.56 MHz. RF generator module 42 may generate approximately 1 Watt of RF power. Rotor electronics 14 may consume approximately 150-200 mW.

In addition to transmitting power to rotor electronics 14, signal processing module 22 may send data to rotor electronics 14 by changing the amplitude of the generated RF signal. For example, RF generator module 42 may generate an RF signal having a first amplitude (e.g., peak to peak voltage) in order to represent a first binary value (e.g., 1), and generate an RF signal having a second amplitude to represent a second binary value (e.g., 0). Both of the first and second amplitudes may provide sufficient power to rotor electronics 14 so that power delivered to rotor electronics 14 remains stable when data is transmitted by RF generator module 42. In some examples, the second RF signal amplitude may be approximately 75% or more of the first RF amplitude.

Processing module 48 may control RF generator module 42 in order to send data to rotor electronics 14. For example, processing module 48 may control RF generator module 42 to modulate the amplitude of the RF signal generated by RF generator module 42 in order to send data to rotor electronics 14. The data sent to rotor electronics 14 may be referred to herein as "configuration data." The configuration data may include a variety of different parameters that are to be programmed into rotor electronics 14. In some examples, the configuration data may include a gain value that rotor electronics 14 may program into programmable gain amplifier 46. In other examples, rotor electronics 14 may derive the gain value from the configuration data. For example, the configuration data may include an expected torque value which rotor electronics 14 may use to determine the gain value. In some examples, processing module 48 may receive configuration data from computing device 24. The configuration data received from computing device 24 may be data entered into computing device 24 by a user, or may be data generated by computing device 24.

In addition to transmitting data to rotor electronics 14, signal processing module 22 may also receive data that is transmitted from rotor electronics 14. In general, rotor electronics 14 may detune a circuit of rotor electronics 14 in order to communicate data to signal processing module 22. Demodulation module 50 may detect the detuning in rotor electronics 14, demodulate the detected signals, and generate digital data based on the detected signals.

Processing module 48 may receive the digital data from demodulation module 50 and send the data to computing device 24 for storage, analysis, and/or display to the user. In some examples, the data received from rotor electronics 14 at processing module 48 may include strain values. In other examples, the data received from rotor electronics 14 may include other data, such as torque values which were derived from strain data by rotor electronics 14. Computing device 24 may display the strain values and/or the torque values to the user and store the strain/torque values for subsequent analysis. In other examples, the data received from rotor electronics 14 may include a currently programmed gain value. For example, a user may use computing device 24 to query a current gain value used in programmable gain amplifier 46 of rotor electronics 14, and, in response to the query, rotor electronics 14 may transmit the gain value back to processing module 48.

Figure 4:
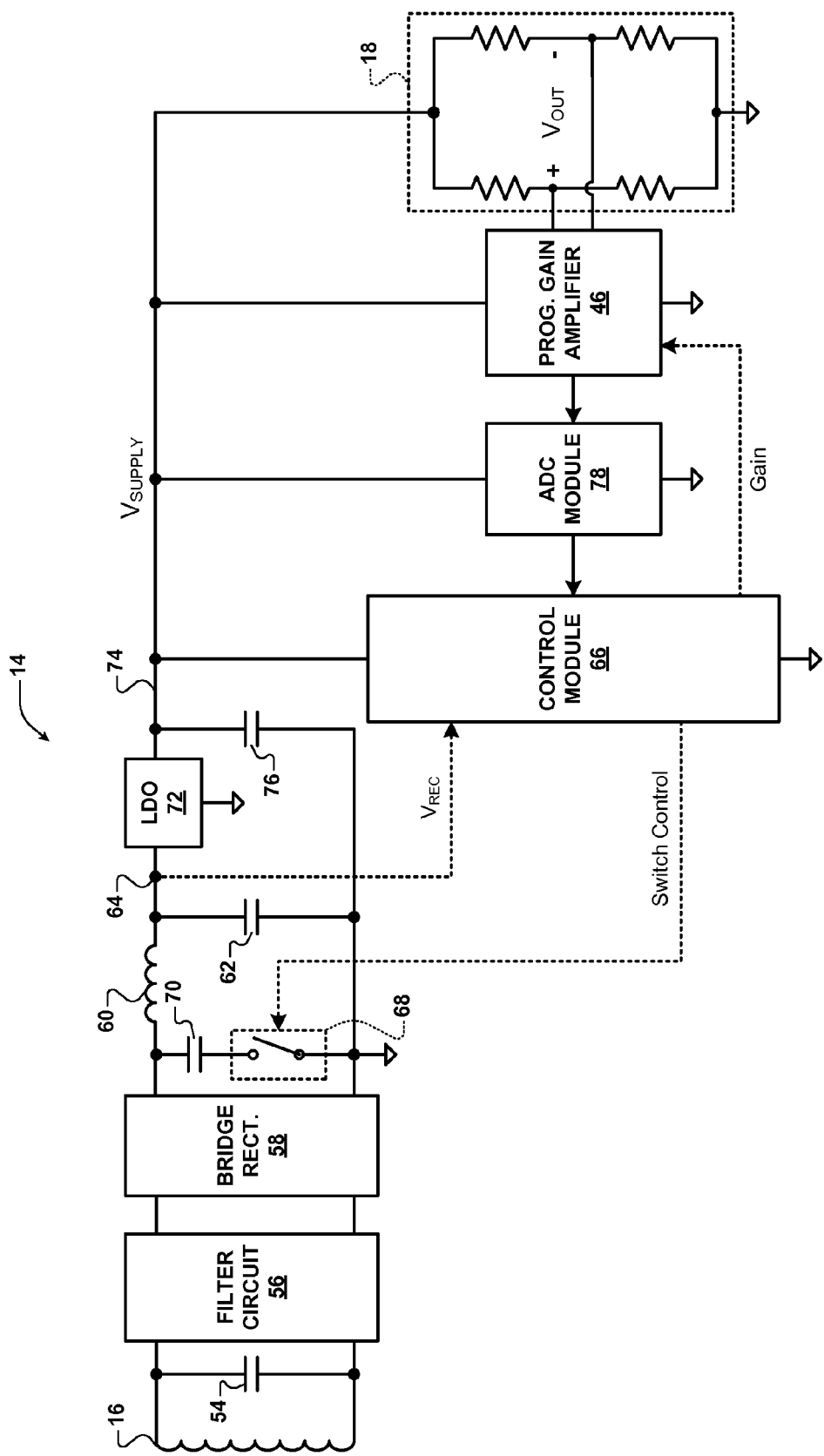
FIG. 4 is a circuit schematic that includes a rotor antenna, rotor electronics, and a strain detection device included in the torque measurement system of FIGS. 1-2.

FIG. 4 is a schematic including rotor antenna 16, rotor electronics 14, and strain detection device 18. The components illustrated in FIG. 4, besides rotor antenna 16 and strain detection device 18, are example components that may be included in rotor electronics 14. Rotor antenna 16 may receive the RF signal generated by RF generator module 42. Capacitor 54 may be a tuning capacitor in parallel with rotor antenna 16. Filter circuit 56 and bridge rectifier 58 may filter and rectify the received RF signal, respectively. Inductor 60 and capacitor 62 may filter out AC components of the rectified RF signal to generate a quasi DC voltage at node 64, e.g., a DC voltage having a small AC ripple.

In some examples, control module 66 may selectively close switch 68 to switch capacitor 70 into the circuit in order to detune the circuit. When capacitor 70 is switched into the circuit, capacitor 70 may be connected in parallel with tuning capacitor 54, which may cause a detuning of the circuit. As described herein, control module 66 may communicate information back to signal processing module 22 by selectively closing switch 68 to detune the circuit (e.g., using an amplitude shift keying scheme).

The voltage at node 64 may be referred to as a recovered voltage ("$V_{REC}$"). $V_{REC}$ may be a relatively stable DC voltage with a small AC ripple. Low drop-out regulator 72 (hereinafter "LDO 72") may regulate $V_{REC}$ to generate a supply voltage $V_{SUPPLY}$ at node 74. Capacitor 76 may remove the remaining AC components from $V_{SUPPLY}$. In some examples, $V_{REC}$ may be a DC voltage from approximately 3.3-9V, depending on the RF signal received at rotor antenna 16. LDO 72 may be configured to output a regulated DC supply voltage. For example, $V_{SUPPLY}$ may be a DC voltage in the range of approximately 3.3-5.5V, depending on the configuration of LDO 72.

Node 74 may provide $V_{SUPPLY}$ to control module 66, ADC module 78, programmable gain amplifier 46, and strain detection device 18. Strain detection device 18 is illustrated as a Wheatstone bridge circuit that receives $V_{SUPPLY}$ and generates an output voltage $V_{OUT}$. Strain detection device 18 may be configured in a variety of different ways. For example, one or more resistors of strain detection device 18 may comprise strain gauges. Each strain gauge may comprise one or more strain gauge elements. In some examples, strain detection device 18 may include only a single strain gauge. In other examples, strain detection device 18 may include multiple strain gauges. Regardless of the number of strain gauges included in strain detection device 18, strain detection device 18 may generate an output voltage $V_{OUT}$ that indicates an amount of strain in rotor 12. The output voltage $V_{OUT}$ of strain detection device 18 may also be referred to herein as a strain signal.

Programmable gain amplifier 46 receives strain signal $V_{OUT}$ and amplifies $V_{OUT}$ by a programmable gain value to generate an amplified strain signal at the output of programmable gain amplifier 46. In other words, the amplified strain signal output to ADC module 78 is equal to the product of the gain value and $V_{OUT}$. In some examples, programmable gain amplifier 46 may include a differential amplification circuit that amplifies input voltage $V_{OUT}$ by the gain value (e.g., an instrumentation amplifier). The gain value of programmable gain amplifier 46 may be set (i.e., programmed) by control module 66. In some examples, control module 66 may be a microcontroller, or similar electronic hardware, that programs programmable gain amplifier 46 using an established interface standard, such as Inter-Integrated Circuit ($I^2C$), Serial Peripheral Interface (SPI), etc.

ADC module 78 may perform an analog-to-digital conversion operation on the amplified strain signals received from programmable gain amplifier 46 to generate digital data (i.e., raw strain data) that indicates the amount of strain in rotor 12. In some examples, ADC module 78 may perform 24-bit conversions at rates of approximately 10-128 thousand samples per second, although other values are contemplated. ADC module 78 may output the raw strain data to control module 66. Control module 66 may transmit, via rotor antenna 16, data that is derived from the amplified strain signals. In some examples, control module 66 may transmit the raw strain data, as received from ADC module 78, to signal processing module 22. In other examples, control module 66 may derive other data based on the raw strain data received from ADC module 78. For example, control module 66 may perform processing operations on the raw strain data, such as averaging or filtering. Control module 66 may also derive torque values based on the raw strain data and then transfer the torque values to signal processing module 22 via rotor antenna 16.

Control module 66 may control switch 68 to transmit data (e.g., strain data and/or torque values) to signal processing module 22. For example, control module 66 may selectively open and close switch 68 to send data to signal processing module 22. Typically, control module 66 may command switch 68 to remain in an open state. In order to transmit data, control module 66 may selectively close switch 68 to connect capacitor 70 into the circuit, which may cause a detuning of the circuit. This detuning may be received at signal processing module 22. For example, demodulation module 50 may demodulate the received signal, including the detuning component, and generate data that may be interpreted by processing module 48. In some examples, control module 66 may be a microcontroller, or a similar electronic component. In these examples, control module 66 may control switch 68 using a general purpose input/output pin, or other pin configured to transmit data. Switch 68 may be a metal-oxide-semiconductor field-effect-transistor (MOSFET) switch in some examples.

As described above, signal processing module 22 may send data to rotor electronics 14 by changing the amplitude of the generated RF signal. A change in the amplitude of the RF signal may cause a change in $V_{REC}$, which may be detected by control module 66. Control module 66 may monitor the voltage $V_{REC}$ to detect data being sent from signal processing module 22.

In some examples, $V_{REC}$ may take on one of two different amplitudes in examples where processing module 48 controls RF generator module 42 to generate an RF signal having two different amplitudes. In such examples, $V_{REC}$ may define a first amplitude when RF generator module 42 generates an RF signal having a first amplitude. $V_{REC}$ may define a second amplitude when RF generator module 42 generates an RF signal having a second amplitude. In general, an RF signal having greater amplitude may generate greater values of $V_{REC}$. Thus, $V_{REC}$ may define a wide range of values in some examples. Control module 66 may monitor the voltage level of $V_{REC}$ and, based on the voltage level of $V_{REC}$ (e.g., as compared to a threshold voltage), retrieve the information that was transmitted by processing module 48. In other words, control module 66 may detect the value of $V_{REC}$ and retrieve the digital data (e.g., the configuration data) based on the detected value of $V_{REC}$. Both of the first and second amplitudes of $V_{REC}$ may provide sufficient power to rotor electronics 14 so that power delivered to rotor electronics 14 remains stable when data is transmitted by signal processing module 22 and detected by control module 66. Although processing module 48 may control RF generator module 42 to generate RF signals having two amplitudes, resulting in two different values of $V_{REC}$, in some examples, processing module 48 may control RF generator module 42 to generate RF signals having more than two amplitudes, which may cause $V_{REC}$ to take on greater than two different values.

Control module 66 may monitor $V_{REC}$ in a variety of different ways. In some examples, control module 66 may monitor $V_{REC}$ by performing a multi-bit analog-to-digital conversion on $V_{REC}$. In these examples, control module 66 may retrieve the digital data sent by processing module 22 based on the magnitude of $V_{REC}$. In examples where control module 66 includes a microcontroller, or a similar electronic component, control module 66 may include an input (e.g., an input pin) to which node 64 is connected. Such an input pin may be an input to an analog-to-digital converter of control module 66 that digitizes the value of $V_{REC}$.

The gain value of programmable gain amplifier 46 may be set to a variety of different values. In general, the adjustability of the programmable gain value may allow torque measurement system 10 to be used effectively in a variety of different testing systems that generate a variety of different torque values. The programmable gain may provide flexibility to torque measurement system 10 because the programmable gain value may allow for accurate amplification and digitization of a wide range of strain signals.

In order to provide an accurate measurement of torque, programmable gain amplifier 46 may have a gain value that amplifies the strain signals as much as possible without saturating programmable gain amplifier 46. For example, it may be beneficial for programmable gain amplifier 46 to amplify received strain signals using a large enough gain value so that the digitized strain data can be represented by the total number of representations available by ADC module 78. However, the magnitude of the gain value should not be so large that amplification of the largest strain signals may cause saturation of programmable gain amplifier 46, which may be undesirable since it may result in the loss of meaningful information. Accordingly, the gain value of programmable gain amplifier 46 may be set such that the largest expected torque applied by the testing system does not saturate programmable gain amplifier 46, but, at the same time, the gain value may be large enough to sufficiently amplify strain signals generated by the smaller expected torque values generated in the testing system.

A torque measurement system that includes a fixed gain amplifier, instead of a programmable gain amplifier, may not be reprogrammed to accommodate for changing torque values. Instead, a fixed gain amplifier may amplify strain signals generated by a strain detection device using a fixed gain value. A fixed gain amplifier may be appropriate for some testing systems, but not for others. For example, if the strain signals generated in the testing system allow for amplification by the fixed gain amplifier without saturation of the fixed gain amplifier, then the use of a fixed gain amplifier may be acceptable. However, if a fixed gain amplifier is used in a testing system in which the strain signals are larger, then it is possible that the fixed gain amplifier would saturate, and, therefore, cause a loss of torque information. If a fixed gain amplifier is used in a testing system in which the strain signals are relatively small, then it is possible that the fixed gain amplifier would not adequately amplify the strain signals such that the full output voltage of the fixed gain amplifier is utilized, which may result in a decrease in the accuracy of torque measurements. Accordingly, torque measurement system 10 including programmable gain amplifier 46 may provide flexibility and accuracy when measuring torque, especially when compared to a torque measurement system including a fixed gain amplifier.

The magnitude of the strain signal $V_{OUT}$ may vary based on the amount of strain in rotor 12. In other words, the magnitude of the strain signal $V_{OUT}$ may vary based on the amount of torque applied to rotor 12. It may be assumed that larger strains applied to strain detection device 18 may tend to generate larger strain signals. It may also be assumed that smaller strains applied to strain detection device 18 may tend to generate smaller strain signals. The range of torques generated by a device under test may range from a value of zero up to a maximum torque value. Strain detection device 18 may generate the smallest amplitude signal (e.g., approximately 0V) when the torque experienced by rotor 12 is approximately zero. Strain detection device 18 may generate the largest amplitude signal when the torque experienced by rotor 12 is at a maximum torque value for the device under test.

The maximum torque value experienced by rotor 12 may depend on the type of device connected to driving shaft 26, the load attached to output shaft 28, and how the device under test is operated (e.g., an amount of power generated by the device). In some examples, it may be preferable to set the gain value of programmable gain amplifier 46 such that the output voltage of programmable gain amplifier 46 may not saturate (i.e., clip) under the highest torque applied to rotor 12. Such a gain value may provide one or more advantages. For example, such a gain value may give the user, or control module 66 when automatic gain is enabled, the ability to observe an ever increasing amount of torque and predict potential saturation of programmable gain amplifier 46. Such a gain value may also provide a safety margin with respect to the maximum torque that produces saturation.

In some examples, it may be desirable to provide adequate amplification of the smaller strain signals generated by strain detection device 18. The gain value of programmable gain amplifier 46 may be selected by a user according to this desire. For example, a user may select the gain value such that smaller strain signals generated by strain detection device 18 may be amplified sufficiently for digital conversion, while larger strain signals may be amplified to a voltage that is near the saturation voltage of programmable gain amplifier 46 without clipping. In examples where the entire range of torques applied to rotor 12 are of interest to a user, the user may program the gain value of programmable gain amplifier 46 such that the output of programmable gain amplifier 46 does not saturate. In examples where torque values in a lower range of torques are of interest, the user may program the gain value of programmable gain amplifier 46 such that smaller strain signals may be amplified, and such that larger strain values may saturate programmable gain amplifier 46 since such larger strain values may not be of interest.

The range of gain values which may be programmed into programmable gain amplifier 46 may vary. In some examples, depending on the sensitivity of strain detection device 18 and the amount of strain that may be experienced by rotor 12, the strain signals may range in amplitude from tenths of millivolts up to 10 mV, or more. In examples where $V_{SUPPLY}$ is approximately 5V and the maximum expected strain signal has an amplitude of 2 mV, a gain value of approximately 2500 may tend to saturate programmable gain amplifier 46. Accordingly, in examples where strain signals are expected to be in the range of approximately 0-2 mV and $V_{SUPPLY}$ is 5V, the gain value of programmable gain amplifier 46 may be set up to 2500 without causing saturation of programmable gain amplifier 46. In examples where $V_{SUPPLY}$ is approximately 5V and the maximum expected strain signal has an amplitude of 10 mV, a gain value of 500 may tend to saturate programmable gain amplifier 46. Accordingly, in examples where strain signals are expected to be in the range of approximately 0-10 mV and $V_{SUPPLY}$ is 5V, the gain value of programmable gain amplifier 46 may be set up to 500 without causing saturation of programmable gain amplifier 46.

It may be assumed that ADC module 78 generates a maximum digital value when the output voltage of programmable gain amplifier 46 is at, or near, saturation. Accordingly, control module 66 may determine that the output voltage of programmable gain amplifier 46 is at, or near, saturation when control module 46 receives maximum digital values from ADC module 78. In general, a greater number of consecutive maximum digital values received from ADC module 78 may tend to be a stronger indication of saturation of programmable gain amplifier 46. In some examples, control module 66 may be configured to detect saturation when a threshold number of digital values received from ADC module 78 are at the maximum digital value.

In some examples, control module 66 may automatically adjust the gain value of programmable gain amplifier 46 in order to prevent programmable gain amplifier 46 from reaching saturation, or in order to bring programmable gain amplifier 46 out of saturation. Control module 66 may determine that the output voltage of programmable gain amplifier 46 is at, or near, saturation when greater than a threshold number of digital values received from ADC module 78 are greater than a threshold value, e.g., at, or near, the maximum digital value of ADC module 78. Control module 66 may adjust (e.g., decrease) the gain value of programmable gain amplifier 46 in response to a determination that programmable gain amplifier 46 is at, or near, saturation in order to prevent saturation of programmable gain amplifier 46, or in order to bring programmable gain amplifier 46 out of saturation. In some examples, control module 66 may also adjust (e.g., increase) the gain value of programmable gain amplifier 46 in response to a determination that programmable gain amplifier 46 is not yet near saturation (i.e., is safely out of range of saturation) in order to improve the quality of the amplified signals for digital conversion.

A user may interact with torque measurement system 10 using computing device 24. For example, the user may view data generated by torque measurement system 10 on a display of computing device 24. The user may also store and analyze data generated by torque measurement system 10 using computing device 24.

The user may have control over the gain value programmed into programmable gain amplifier 46. In some examples, the user may manually enter a gain value into computing device 24. In these examples, computing device 24 may transfer the gain value to signal processing module 22, which in turn may transmit the gain value to control module 66 for programming into programmable gain amplifier 46.

In other examples, a user may not have direct knowledge of the gain values used by programmable gain amplifier 46. However, the user may generally have knowledge of the torque values that will be present in the testing system. For example, the user may have knowledge of the amount of torque that rotor 12 will be subjected to during testing. In these examples, the user may enter expected torque values into computing device 24. For example, the user may enter torque ranges or an expected maximum torque that will be experienced by rotor 12 during operation of the testing system.

One or more components of torque measurement system 10 may determine the gain value to be programmed into programmable gain amplifier 46 based on the expected maximum torque entered by the user. Generally, torque measurement system 10 may use a gain value that will not cause programmable gain amplifier 46 to saturate, but instead will allow for proper amplification of strain signals for a range of torque values up to the maximum torque value entered by the user.

In some examples, torque measurement system 10 may use a look-up table, or an equation, to determine the gain value to program into programmable gain amplifier 46 based on the maximum torque value entered by the user. In some examples, a predetermined amount of strain generated in rotor 12 may correspond to a predetermined amount of torque applied to rotor 12. The predetermined relationship between strain and torque may be included in a look-up table, or represented by an equation, which may be included in a component of torque measurement system 10, such as signal processing module 22, rotor electronics 14, or computing device 24. Using the look-up table, or equation, torque measurement system 10 may determine a maximum amount of strain that may be experienced by rotor 12. The maximum amount of strain in rotor 12 may correspond to a maximum strain signal amplitude. Torque measurement system 10 may include a look-up table, or equation, that relates the magnitude of the strain in rotor 12 and the magnitude of the strain signals. Using this look-up table, or equation, torque measurement system 10 may determine the maximum gain value to program into programmable gain amplifier 46 in order to amplify the strain signals sufficiently without saturating programmable gain amplifier 46 at higher torque values.

In some examples, computing device 24 may determine the gain value to program into programmable gain amplifier 46 based on the expected torque value entered by the user. For example, computing device 24 may include the lookup table (s) and/or equation (s) that computing device 24 may use to determine a gain value based on an expected torque value. In other examples, signal processing module 22 may determine the gain value to program into programmable gain amplifier 46 based on the expected torque value entered by the user. For example, signal processing module 22 may include the lookup table(s) and/or equation (s) that signal processing module 22 may use to determine a gain value based on an expected torque value. In still other examples, control module 66 may determine the gain value to program into programmable gain amplifier 46 based on the expected torque value entered by the user. For example, control module 66 may include the lookup table(s) and/or equation (s) that control module 66 may use to determine a gain value based on an expected torque value.

In some examples, control module 66 may update the gain value automatically in order to prevent saturation of programmable gain amplifier 46. Control module 66 may update the gain value automatically instead of, or in addition to, receiving a user specified torque value via computing device 24. The user may input into computing device 24 a command that instructs control module 66 to automatically update the gain value of programmable gain amplifier 46 in order to initiate automatic updating of the gain value.

In response to receipt of the automatic update command, control module 66 may begin automatically controlling the gain value of programmable gain amplifier 46 to prevent saturation, as described above. While control module 66 is automatically controlling the gain value of programmable gain amplifier 46, control module 66, or other component of system 10, may determine a current torque being applied to rotor 12 based on the currently programmed gain value and the raw strain data generated by ADC module 78. In some examples, control module 66 may transmit the raw strain data, or other data derived from the raw strain data, and the associated gain value to processing module 22 and/or computing device 24 so that processing module 22 and/or computing device 24 may determine a current torque value using lookup table(s) and/or equation (s).

Figure 5:
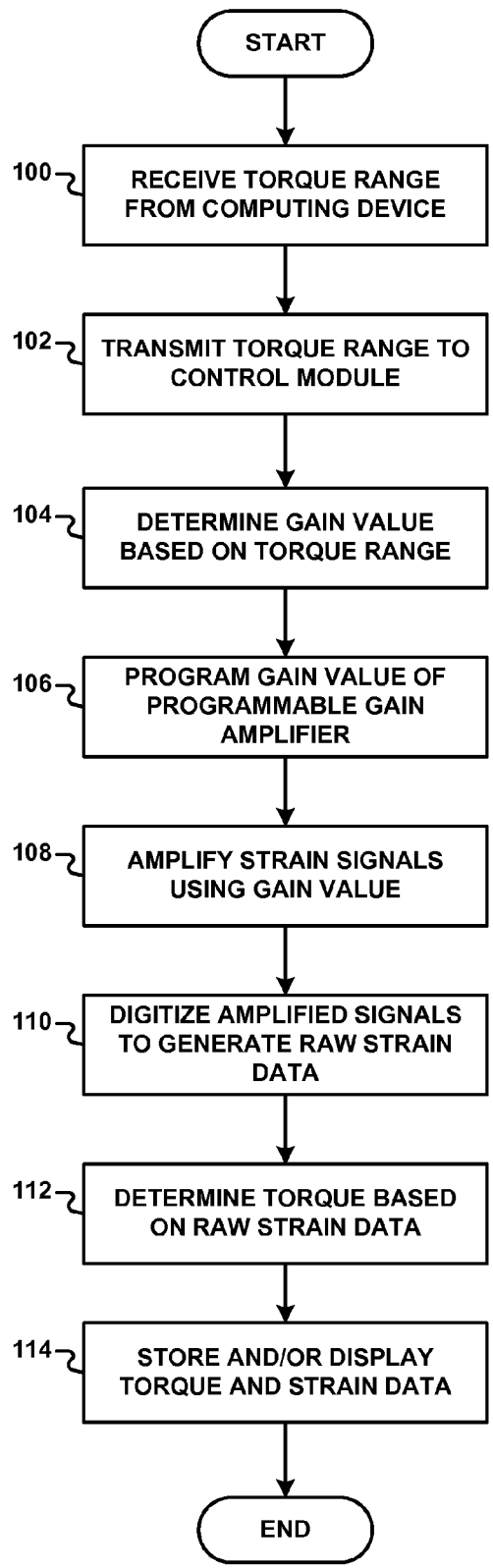
FIG. 5 is a flow chart that describes operation of the torque measurement system of FIGS. 1-2.

FIG. 5 is a flow chart that illustrates operation of torque measurement system 10. Prior to the start of the method of FIG. 5, the user may attach rotor 12 to driving shaft 26 of the device under test (e.g., an engine). The user may also connect output shaft 28 to rotor 12. Output shaft 28 may be connected to a load that the device under test will drive during testing. The flow chart of FIG. 5 may illustrate a usage scenario in which torque measurement system 10 receives a torque range from the user. For example, the torque range may indicate a maximum expected torque that torque measurement system 10 may measure during testing.

Prior to testing the device under test, the user may enter an expected torque range into computing device 24. Signal processing module 22 receives the expected torque range from computing device 24 (100). Signal processing module 22 transmits the torque range to control module 66 (102). Control module 66 may determine an appropriate gain value to program into programmable gain amplifier 46 based on the received torque range (104). The appropriate gain value may be a gain value that may not cause saturation of programmable gain amplifier 46 when rotor 12 is experiencing torque in the expected torque range. In some examples, control module 66 may determine the gain value based on tables and/or equations that relate an amount of torque in rotor 12 to a proper gain value that may not saturate programmable gain amplifier 46. Although control module 66 may determine the proper gain value to program into programmable gain amplifier 46, in other examples, computing device 24 or processing module 22 may determine the proper gain value and subsequently transmit the proper gain value to control module 66 for programming into programmable gain amplifier 46.

After determining the gain value, control module 66 may program the gain value into programmable gain amplifier 46 (106). Programmable gain amplifier 46 may then amplify strain signals received from strain detection device 18 by the programmed gain value (108). ADC module 78 may digitize the amplified strain signals to generate raw strain data (110). Control module 66 may then determine the amount of torque being applied to rotor 12 based on the raw strain data (112). For example, control module 66 may include lookup tables and/or equations which control module 66 may use to determine the amount of torque being applied to rotor 12 based on the raw strain data and the current gain value. Computing device 24 may receive the torque values and/or strain values from control module 66. Computing device 24 may store and/or display the received values (114). Although control module 66 may determine the torque being experienced by rotor 12, in some examples, control module 66 may transmit the raw strain data, or digital data derived from the raw strain data (e.g., averaged values), to signal processing module 22 and/or computing device 24, which may alternatively determine the amount of torque being experienced by rotor 12.

Figure 6:
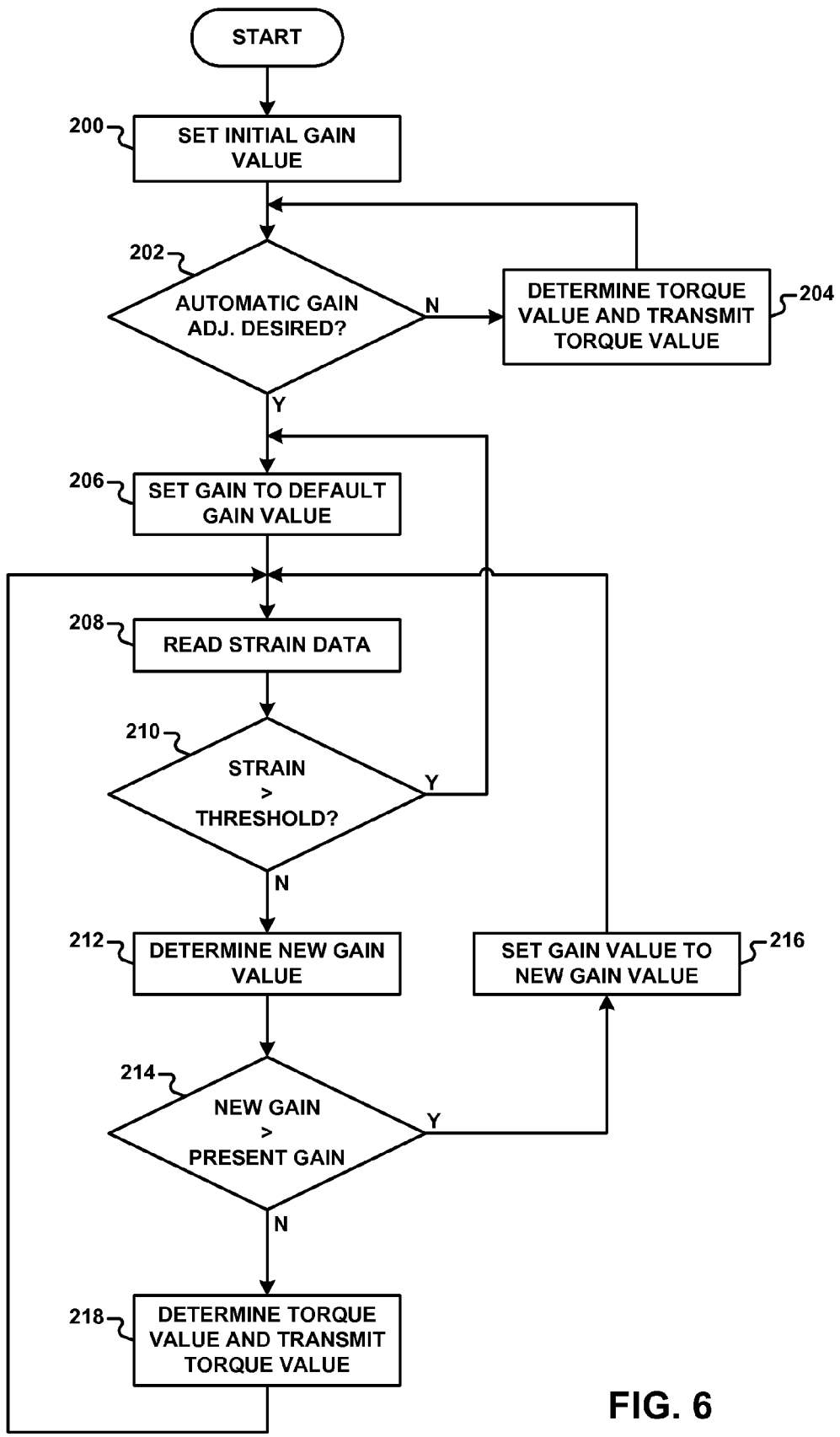
FIG. 6 is a flow chart that shows a method for automatically adjusting the gain value of a programmable gain amplifier included in the torque measurement system of FIGS. 1-2.

FIG. 6 is a flow chart showing a method for automatically adjusting the gain value of a programmable gain amplifier included in a torque measurement system. In the method of FIG. 6, control module 66 may set the gain value of programmable gain amplifier 46 to a default value when automatic gain adjustment is selected by a user. The default value may generally be a low (e.g., a minimum) gain value that is not likely to saturate programmable gain amplifier 46. Control module 66 may then increase the gain value of programmable gain amplifier 46 from the default value so that the output voltage of programmable gain amplifier 46 is brought to a value which is sufficiently large for digitization by ADC module 78. In the case that the current gain value of programmable gain amplifier 46 becomes too large, e.g., due to an increase in the amount of torque, control module 66 may reset the gain value of programmable gain amplifier 46 back to the default value, which may generally not saturate programmable gain amplifier 46 even under the increased amount of torque. In some examples, as described above, a user may enter a command into computing device 24 that instructs control module 66 to automatically adjust the gain value of programmable gain amplifier 46.

Prior to the start of the method of FIG. 6, it may be assumed that a user has entered an initial gain value to be programmed into programmable gain amplifier 46. The initial gain value may be selected by the user, e.g., based on an expected amount of torque. In the example of FIG. 6, computing device 24 may receive the initial gain value from a user. Initially, computing device 24 sets the gain value of programmable gain amplifier 46 to the initial gain value (200). Control module 66 then determines whether the user has entered a command indicating that automatic gain adjustment is desired (202). If the user has not entered a command indicating that automatic gain control is desired, then control module 66 may determine the amount of torque being experienced by rotor 12 based on raw strain data generated while using the initial gain value (204).

If the user has entered a command indicating that automatic gain adjustment is desired, then control module 66 may set the gain value of programmable gain amplifier 46 to a default gain value (206). As described above, the default gain value may be a relatively small gain value that generally may not saturate programmable gain amplifier 46, even when strain detection device 18 outputs relatively large strain signals, i.e., when strain detection device 18 is subjected to a relatively large strain. For example, the default gain value may be a gain value that may not cause saturation of programmable gain amplifier 46 when the strain signals are at, or near, a maximum amplitude. In some examples, the default gain value may be set to a gain that is at, or near, the minimum gain value of programmable gain amplifier 46.

After the gain value is set to the default value in block (206), programmable gain amplifier 46 may amplify strain signals using the default gain value and control module 66 may receive the raw strain data from ADC module 78 (208). Control module 66 then determines whether the output of programmable gain amplifier 46 is greater than a threshold value (210). The threshold value may be a digital value that represents a maximum acceptable output voltage of programmable gain amplifier 46 or ADC module 78. In some examples, the threshold value may correspond to an output voltage of programmable gain amplifier 46 and/or ADC module 78 at a point where programmable gain amplifier 46 and/or ADC module 78 behave in a non-linear or saturated manner.

Since the default gain value is initially set to a low gain value, it would be unlikely that the output of programmable gain amplifier 46 is greater than the threshold value initially. Accordingly, it would be likely that the output of programmable gain amplifier 46 is less than the threshold value in block (210), at least while the gain is set to the default gain value. After the gain value of programmable gain amplifier 46 has been increased in subsequent blocks, the output of programmable gain amplifier 46 may be greater than the threshold value in block (210). Additionally, or alternatively, the output of programmable gain amplifier 46 may be greater than the threshold value in block (210) if the amount of applied torque increases. If control module 66 determines that the output of programmable gain amplifier 46 is greater than the threshold value in block (210), control module 66 may reset the gain value to the default gain value in block (206).

If the output of programmable gain amplifier 46 is less than the threshold value in block (210), control module 66 may determine a new gain value in block (212). Control module 66 may determine the new gain value based on a variety of different parameters, such as the present gain value and the magnitude of the strain data read in block (208). In some examples, control module 66 may determine the new gain value using an equation that yields the new gain value based on the variety of parameters, such as the current gain and the current magnitude of the strain data read in block (208). In some example, control module 66 may determine the new gain value using additional, or alternative, parameters, such as a null offset value of strain detection device 18, available configurations of programmable gain amplifier 46, and other correction coefficients associated with rotor electronics 14. In general, control module 66 may be configured to generate a new gain value that sufficiently amplifies the strain signals for A/D conversion, without saturating the output of programmable gain amplifier 46. Put another way, control module 66 may generate (e.g., using an equation) a new gain value that may be better suited for amplification of strain signals under the current conditions. The null offset of strain detection device 18 may refer to a correction applied to strain detection device 18 so that strain detection device 18 generates a strain signal having zero magnitude when applied strain is zero. The available configurations of programmable gain amplifier 46 may include the possible gain values which may be programmed into programmable gain amplifier 46. For example, programmable gain amplifier 46 may be limited to a certain range of gain values and a discrete number of different gain values within the range in some implementations. Other correction coefficients associated with rotor electronics 14 may refer to other parameters used by control module 66 to compensate for various tolerances of rotor electronics 14.

Control module 66 then determines whether the new gain value is greater than the present gain value (214). If control module 66 determines that the new gain value is greater than the present gain value, control module 66 programs the new gain value into programmable gain amplifier 46 (216). Programming the new gain value into programmable gain amplifier 46 when the new gain value is larger than the present gain value may help to ensure that strain signals are sufficiently amplified without saturating the output of programmable gain amplifier 46. If control module 66 determines that the new gain value is less than the present gain value, then control module 66 determines the amount of torque experienced by rotor 12 and transmits the value to signal processing module 22 (218).

Figure 7:
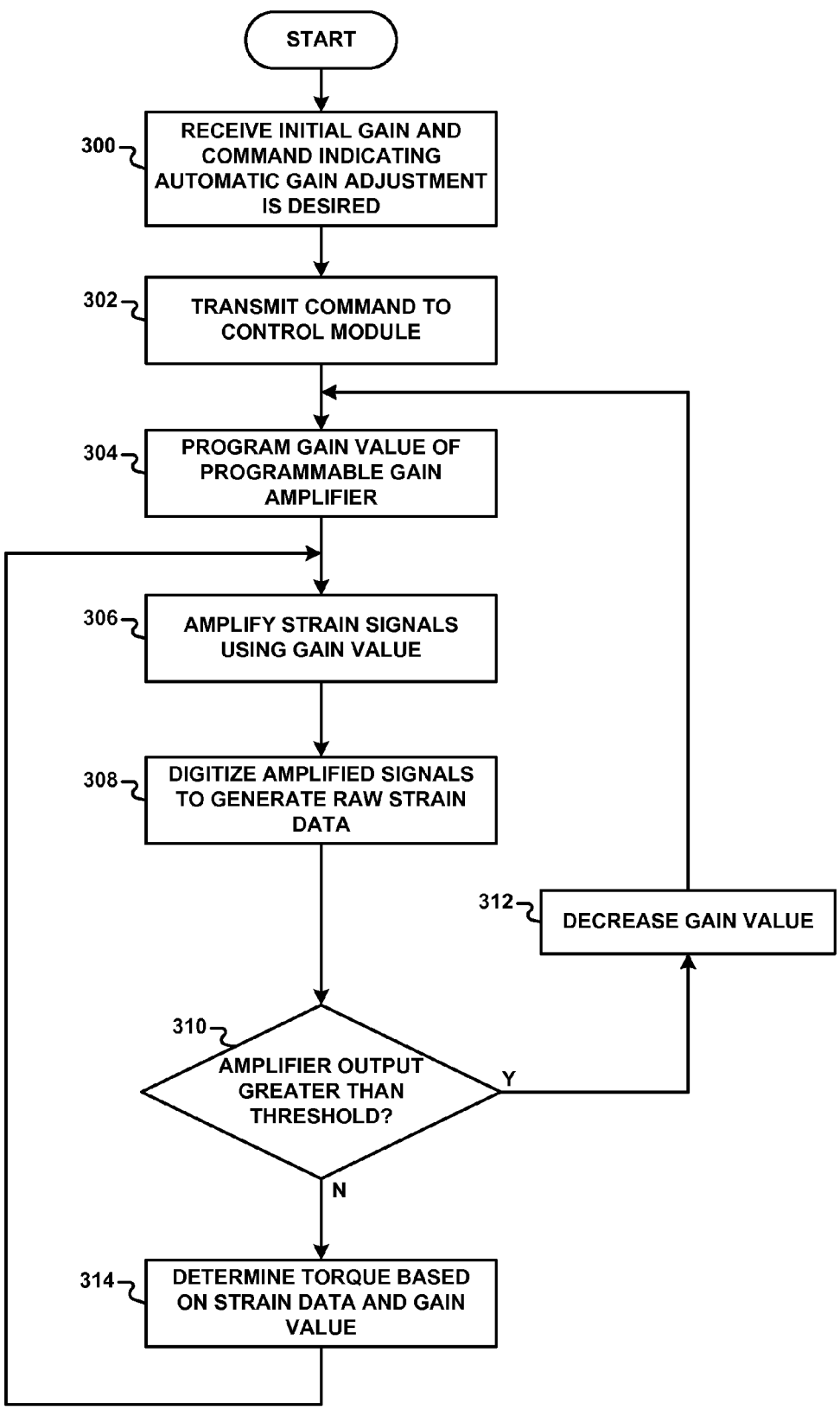
FIG. 7 is a flow chart that shows another method for automatically adjusting the gain value of a programmable gain amplifier included in the torque measurement system of FIGS. 1-2.

FIG. 7 is a flow chart showing another method for automatically adjusting the gain value of a programmable gain amplifier included in a torque measurement system. In the method of FIG. 7, the gain value of programmable gain amplifier 46 is automatically adjusted (i.e., decreased) in order to bring programmable gain amplifier 46 out of saturation when control module 66 determines that programmable gain amplifier 46 has reached saturation. In some examples, as described above, a user may enter a command into computing device 24 that instructs control module 66 to automatically adjust the gain value of programmable gain amplifier 46. Prior to the start of the method of FIG. 7, it may be assumed that a user has entered a command into computing device 24 that instructs control module 66 to automatically adjust the gain of programmable gain amplifier 46. Additionally, it may be assumed that the user has entered an initial gain value to be programmed into programmable gain amplifier 46.

In the example of FIG. 7, computing device 24 receives the initial gain value along with the command indicating that automatic gain adjustment is desired (300). Computing device 24 transmits the command and the initial gain value to control module 66 (302). Upon receipt of the command, control module 66 programs the initial gain value into programmable gain amplifier 46 (304). Programmable gain amplifier 46 then amplifies the strain signals received from strain detection device 18 using the initial gain value (306). ADC module 78 digitizes the amplified signals to generate raw strain data (308).

Control module 66 receives the raw strain data from ADC module 78 and determines whether the output of programmable gain amplifier 46 is greater than a threshold value (310). The threshold value may be a digital value that represents a maximum acceptable output voltage of programmable gain amplifier 46. In some examples, the threshold value may correspond to an output voltage of programmable gain amplifier 46 at a point where programmable gain amplifier 46 is saturated. In some examples, control module 66 may determine that the output voltage of programmable gain amplifier 46 is greater than the threshold value after a single digitized value is greater than the threshold value in block (310). In other examples, control module 66 may require that a plurality of digitized values be greater than the threshold value before determining that the output voltage of programmable gain amplifier 46 is greater than a threshold value in block (310).

The receipt of one or more digitized values from ADC module 78 may indicate that the output voltage of programmable gain amplifier 46 is being clipped. When clipping occurs, it may indicate that the initial gain value programmed into programmable gain amplifier 46 may be too large. If control module 66 determines that the output of programmable gain amplifier 46 is greater than a threshold value in block (310), control module 66 may decrease the gain value from the initial gain value in order to remedy the potential clipping of the output voltage of programmable gain amplifier 66 (312). If control module 66 determines that the output of programmable gain amplifier 46 is less than the threshold value, then control module 66 may determine the amount of torque being experienced by rotor 12 based on the received raw strain data and the current gain value (314).

Although the torque measurement system of the present disclosure is described as measuring strain in a rotor and determining an amount of torque applied to the rotor, the torque measurement system of the present disclosure may be configured to measure strain and determine torque in devices other than a rotor. For example, the torque measurement system of the present disclosure may be configured to measure torque in any general mechanical component. In some examples the mechanical component may be a moving component. In these examples, the movement of the mechanical component may be rotational or linear, for example. In some examples, the mechanical component may be a stationary component that is fixed in place, such as a cantilever.

The mechanical component may receive a force from a driving component and may experience a strain in response to the force. The force received by the mechanical component may be rotational or linear, for example. A strain detection device may be attached to the mechanical component and may generate strain signals that indicate an amount of strain in the mechanical component. The mechanical component may include electronics that function in a manner similar to the rotor antenna and the rotor electronics described above. For example, electronics attached to the component may include a control module, an ADC module, a programmable gain amplifier, and an antenna as described above. The electronics attached to the mechanical component may communicate with and receive power from a stator antenna that is detached from the mechanical component. The stator antenna may be connected to a signal processing module, which in turn may be connected to a computing device, as described above.

Although some examples have been described in detail above, other examples and modifications are within the scope of this disclosure. For example, the flow diagrams depicted in the figures do not require the particular order shown, or sequential order, to achieve desirable results. Other steps may be provided, or steps may be eliminated, from the described flow diagrams, and other components may be added to, or removed from, the described systems. Other embodiments may be within the scope of the following claims.

What is claimed is:

1. A system comprising:
   a rotor;
   a rotor antenna attached to the rotor;
   a strain detection device attached to the rotor and configured to generate signals that indicate an amount of strain in the rotor;
   a programmable gain amplifier attached to the rotor and configured to amplify the signals generated by the strain detection device by a gain value, wherein the gain value is programmable;
   a control module attached to the rotor and configured to:
      program the gain value of the programmable gain amplifier; and
      transmit, via the rotor antenna, digital data that is derived from the amplified signals;
   a stator antenna configured to communicate with the rotor antenna while the rotor is rotating; and
   a signal processing module configured to:
      transmit, via the stator antenna, signals that provide power and data to the control module; and
      receive, via the stator antenna, the digital data transmitted by the control module.

2. The system of claim 1, wherein the rotor is configured to connect to a driving shaft that rotates the rotor, and wherein the rotor antenna, the strain detection device, the programmable gain amplifier, and the control module are configured to rotate along with the rotor.

3. The system of claim 1, wherein the rotor is configured to couple a driving shaft to an output shaft, wherein the rotor is configured to transfer a torque applied by the driving shaft to the output shaft, and wherein the amount of strain in the rotor is induced when the torque is applied by the driving shaft.

4. The system of claim 1, wherein the strain detection device comprises one or more strain gauges that are configured to generate the signals that indicate the amount of strain in the rotor.

5. The system of claim 1, wherein the control module is configured to automatically update the gain value based on the amplitude of the amplified signals generated by the programmable gain amplifier.

6. The system of claim 5, wherein the control module is configured to:
   determine whether the amplitude of the amplified signals are greater than or equal to a threshold value; and
   decrease the gain value in response to a determination that the amplified signals are greater than or equal to the threshold value.

7. The system of claim 6, wherein the threshold value is approximately equal to an output voltage saturation value of the programmable gain amplifier.

8. The system of claim 1, further comprising an analog-to-digital converter module attached to the rotor and configured to receive the amplified signals and digitize the amplified signals to generate the digital data.

9. The system of claim 1, wherein the control module is configured to receive the gain value from the signal processing module.

10. The system of claim 1, wherein the control module is configured to determine the gain value based on data received from the signal processing module.

11. The system of claim 1, wherein at least one of the signal processing module and the control module is configured to determine an amount of torque being experienced by the rotor based on the amplitude of the amplified signals.

12. The system of claim 1, wherein at least one of the signal processing module and the control module are configured to determine the gain value based on an expected torque value received from a user.

13. A system comprising:
   a rotor antenna configured to attach to a rotor;
   a strain detection device configured to attach to the rotor and generate signals that indicate an amount of strain in the rotor;
   a programmable gain amplifier configured to attach to the rotor and configured to amplify the signals generated by the strain detection device by a gain value, wherein the gain value is programmable;
   a control module configured to attach to the rotor and configured to program the gain value of the programmable gain amplifier and transmit, via the rotor antenna, digital data that is derived from the amplified signals;
   a stator antenna configured to communicate with the rotor antenna while the rotor is rotating; and
   a signal processing module that is configured to:

transmit, via the stator antenna, signals that provide power and data to the control module; and receive, via the stator antenna, the digital data transmitted by the control module.

14. The system of claim 13, further comprising the rotor, wherein the rotor is configured to connect to a driving shaft that rotates the rotor, and wherein the rotor antenna, the strain detection device, the programmable gain amplifier, and the control module are configured to rotate along with the rotor while the stator antenna and the signal processing module are stationary.

15. The system of claim 13, wherein at least one of the control module and the processing module is configured to automatically update the gain value based on the amplitude of the amplified signals generated by the programmable gain amplifier.

16. The system of claim 13, wherein the control module is configured to receive the gain value from the signal processing module via the rotor antenna.

17. The system of claim 13, wherein the control module is configured to determine the gain value based on data received from the signal processing module.

18. A system comprising:

a mechanical component configured to receive a force;

a first antenna attached to the mechanical component;

a strain detection device attached to the mechanical component and configured to generate signals that indicate an amount of strain in the mechanical component;

a programmable gain amplifier attached to the mechanical component and configured to amplify the signals generated by the strain detection device by a gain value, wherein the gain value is programmable;

a control module attached to the mechanical component and configured to:

program the gain value of the programmable gain amplifier; and transmit, via the first antenna, digital data that is derived from the amplified signals;

a second antenna, detached from the mechanical component, that is configured to communicate with the first antenna; and a signal processing module configured to:

transmit, via the second antenna, signals that provide power and data to the control module; and receive, via the second antenna, the digital data transmitted by the control module.

19. The system of claim 18, wherein the signal processing module is configured to receive a force value from a user, and wherein at least one of the signal processing module and the control module are configured to generate the gain value based on the force value received from the user.

* * * * *